Patented June 29, 1954

2,682,544

UNITED STATES PATENT OFFICE 2,682,544

ARYL-PYRIDYLMETHYL ALKYL SULFONES AND THEIR PREPARATION

Sydney Archer, Albany, N. Y., assignor to Sterling Drug Inc., New York, N. Y., a corporation of Delaware No Drawing. Application September 27, 1950, Serial No. 187,153

16 Claims. (Cl. 260—294.8)

This invention relates to aryl-pyridylmethyl alkyl sulfones and to their preparation.

The sulfones of my invention have the general formula

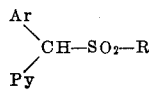

where Ar is a monocarbocyclic aromatic radical, Py is a 2-pyridyl radical and R is a lower alkyl radical, Ar and Py being further characterized by being inert to strongly basic condensing agents. These sulfones are useful as intermediates in the preparation of pharmaceuticals, while some exhibit valuable pharmacological properties, e. g., anticonvulsant activity.

In the above formula the monocarbocyclic aromatic radical designated as Ar means a radical obtained by removing one hydrogen from benzene and optionally substituting for any of the other hydrogens, substituent groups. It is necessary however that the resulting aryl group be one inert to the action of strongly basic condensing agents, in order that the sulfones be preparable by my process without obtaining undesired side-reactions. It is therefore necessary to select as any substituents, only radicals which, when attached to the benzene ring, are themselves inert. Such radicals include hydrocarbon groups, ether groups, tertiary-amino groups, halogens, and the trifluoromethyl group. However groups having a hydrogen capable of being replaced by a strongly electropositive metal, such as hydroxyl, mercapto, primary or secondary amino, and groups susceptible to condensation under the influence of strong basic condensing agents, such as cyano or acyloxy groups, are not suitable as substituents in Ar. A preferred class of Ar for my invention consists of the unsubstituted phenyl radical and phenyl radicals substituted by from one to three substituents selected from the class consisting of R', R'O, halo, tertiary-amino and trifluoromethyl, where R' is a hydrocarbon radical selected from the group consisting of alkyl radicals having from 1 to 6 carbon atoms and aryl and aralkyl radicals having 6 to 10 carbon atoms. Furthermore, said substituents can be in any of the available positions of the phenyl nucleus, and where more than one, can be the same or different and can be in any of the various position combinations relative to each other. The halo substituents include chloro, bromo, iodo and fluoro; and the tertiary-amino substituents are di-(lower alkyl)amino, wherein the lower alkyl groups each have 1-6 carbon atoms, such as dimethylamino, diethylamino, methylethylamino, di-n-butylamino, and the like, and saturated heteromonocyclic nitrogen-containing radicals having 5-6 ring atoms, such as N-piperidino, N-morpholino, N-pyrrolidino and lower alkyl substituted derivatives thereof, such as 2-methyl-N-piperidino, 3-ethyl-N-piperidino, 2,5-dimethyl-N-pyrrolidino, and the like.

The 2-pyridyl radical designated hereinabove as Py must, for the reasons discussed in connection with Ar above, be devoid of substituents which, when attached to the pyridine ring, would enter into reaction under the influence of the strong basic condensing agents. Thus, as with the case for Ar, substituents like hydroxyl, mercapto, primary or secondary amino, and substituents like cyano or acyloxy are unsuitable in Py. As with the case of Ar, suitable and permissible substituents in Py include hydrocarbon groups, ether groups, tertiary-amino groups and the trifluoromethyl group. However, a halogen in Py is a suitable substituent only if it is in the 3 or 5 positions, since only in these positions is it inert. A preferred class of Py for my invention consists of the unsubstituted 2-pyridyl radical, 5-(lower alkoxy)-2-pyridyl, 5-halo-2-pyridyl and (lower alkyl)-substituted-2-pyridyl radicals. The lower alkoxy and lower alkyl substituents of the 2-pyridyl radicals have preferably 1 to 6 carbon atoms, including such substituents as methoxy, ethoxy, n-propoxy, isopropoxy, isobutoxy, n-amoxy, n-hexoxy, and the like for lower alkoxy, and methyl, ethyl, n-propyl, isopropyl, n-butyl, isobutyl, 2-butyl, n-amyl, n-hexyl, and the like for lower alkyl.

The lower alkyl radical designated hereinabove as R has preferably 1–6 carbon atoms and thus includes radicals such as methyl, ethyl, n-propyl, isopropyl, isobutyl, 2-butyl, n-butyl, n-amyl, n-hexyl, and the like.

The sulfones of my invention were prepared by heating a benzyl alkyl sulfone having the formula, ArCH₂SO₂R, with a 2-halopyridine having the formula, Py-halogen, where Ar, Py and R have the meanings designated hereinabove and halogen is preferably chlorine, bromine or iodine, in the presence of a strongly basic condensing agent such as sodium amide, sodium hydride, potassium amide, lithium amide, phenyl lithium, or the like. The strongly basic condensing agent can also be termed a metallating agent since it is characteristic of such agents that they are able to replace the very weakly acidic hydrogen atom of a methylene group adjacent to the $SO_2$ in a sulfone by a strongly electropositive metal like sodium, potassium, lithium, calcium, magnesium, etc. Illustrative of my process is the reaction of 3,4-diethoxybenzyl ethyl sulfone with 5-chloro-2-bromopyridine to yield 3,4-diethoxyphenyl-(5-chloro-2-pyridyl)methyl ethyl sulfone. In practicing my invention I prefer to use sodium amide as the condensing agent because of its availability and low cost. Toluene is preferred as the reaction medium, however, other non-polar solvents inert to strong basic condensing agents may be used, such as for instance benzene, xylene, and other suitably volatile liquid hydrocarbons. The choice of solvent is not critical provided only it does not have even weakly acidic properties, and provided it is not susceptible of condensation under the action of strong basic condensing agents. Such solvents as a class are well-known to the art.

My new compounds in the form of their free bases are white crystalline solids soluble in organic solvents such as ethanol and in oils such as olive oil, sesame oil and the like, and can be used in this form for some therapeutic purposes. The new compounds are also soluble in aqueous solutions of strong acids, in which solutions they are present in the form of their acid addition salts. The acid addition salt form of any of my new compounds can be isolated as a white crystalline solid soluble in water. Such acid addition salts coming within the scope of my invention are those derived from strong non-toxic acids, including hydrochloric acid, hydrobromic acid, sulfuric acid, phosphoric acid, sulfamic acid, benzenesulfonic acid, toluenesulfonic acid, and the like.

The following examples will further illustrate specific embodiments of the invention.

EXAMPLE 1

A. *Benzyl alkyl sulfones*

General procedures for preparing these intermediate sulfones are given on pages 660–667 of "Organic Chemistry of Sulfur" by C. M. Suter, published by John Wiley & Sons, Inc., New York. N. Y., 1944. In preparing members of this group of compounds I found convenient the method of reacting a sodium benzyl mercaptide having the formula $ArCH_2SNa$ with an alkyl halide having the formula R-halogen to yield the sulfide having the formula $ArCH_2-S-R$, which I then oxidized to yield the corresponding benzyl alkyl sulfone. In the oxidation step I preferably used hydrogen peroxide because its use resulted in a clean reaction with a high yield. Illustrative of this procedure is the preparation of benzyl n-butyl sulfone by reacting sodium benzyl mercaptide with n-butyl bromide to obtain benzyl n-butyl sulfide which on oxidation yielded benzyl n-butyl sulfone, M. P. 95–97° C.

Other benzyl alkyl sulfones prepared in the foregoing manner are given in Table I.

TABLE I $ArCH_2-SO_2-R$

| Ar | R | M. p., ° C. |
|---|---|---|
| Phenyl | methyl | 125–127 |
| Do | ethyl | 83–5 |
| Do | n-propyl | 88.0–89.5 |
| 3-Methoxyphenyl | ethyl | a63.0–63.9 |
| 4-Methoxyphenyl | do | a103–104 |
| 2-Chlorophenyl | methyl | a92–93.5 |
| 3-Chlorophenyl | do | 83.5–85.5 |
| 4-Chlorophenyl | do | 120–122 |
| Do | ethyl | a91.9–93.1 |
| 3,4-Dichlorophenyl | do | a110.4–112.4 |
| 4-Methylphenyl | do | 75–77 | a Corrected.

Other benzyl alkyl sulfones which can be prepared according to the foregoing procedure include: benzyl isobutyl sulfone; 3-bromobenzyl ethyl sulfone; 4-iodobenzyl isopropyl sulfone; 3-ethoxy-4-methoxybenzyl 2-butyl sulfone; 3-ethylbenzyl methyl sulfone; 4 - n - butoxybenzyl methyl sulfone; 4-dimethylaminobenzyl ethyl sulfone; 4-N-piperidinobenzyl n-butyl sulfone; 3-trifluoromethylbenzyl isobutyl sulfone; 3-phenoxybenzyl methyl sulfone; 3-ethoxy-4-benzyloxybenzyl ethyl sulfone; 3,4-dibenzyloxybenzyl ethyl sulfone; 3,4,5-trimethoxybenzyl ethyl sulfone; 4-phenylbenzyl ethyl sulfone; 4-benzylbenzyl methyl sulfone; and the like.

B. *4-chlorophenyl-2-pyridylmethyl ethyl sulfone*

A mixture of 75 g. of 4-chlorobenzyl ethyl sulfone, 13.5 g. of sodium amide and 500 cc. of dry toluene in a two-liter three-necked flask equipped with a mercury-seal stirrer, a condenser protected with a drying tube and a dropping funnel, was refluxed for two hours, during which time most of the sodium amide had reacted. A solution of 54.3 g. of 2-bromopyridine in 200 cc. of dry toluene was added slowly over a period of ninety minutes, during which time the reaction mixture became increasingly cloudy. The refluxing was continued for two hours. Then 25 cc. of ethanol was added to the cooled reaction mixture to destroy the excess sodium amide and the toluene layer was washed once with water. The product was extracted from the toluene layer with three 100 cc. portions of 6 N hydrochloric acid. The combined acidic extracts were neutralized with 35% aqueous sodium hydroxide solution and the unreacted 2-bromopyridine was removed by steam distillation. The oily residue which crystallized upon rubbing with a glass rod was collected and recrystallized three times from ethanol, treating with decolorizing charcoal in each instance. There was thus obtained, as a white crystalline solid melting at 120.4–122.2° C. (corr.), 18.5 g. of the free base form of 4-chlorophenyl-2-pyridylmethyl ethyl sulfone.

Anal. Calcd. for $C_{14}H_{14}ClNO_2S$: S, 10.84. Found: S, 10.75.

Treatment of this sulfone in its free base form with ethanolic-hydrogen chloride as described in Example 9 hereinafter results in the formation of its hydrochloride, precipitation of which is effected only after addition of excess ether due to the solubility of the salt in ethanol. Treatment of the same sulfone in its free base form with sulfuric acid or phosphoric acid yields respectively the sulfate, or the phosphate addition salts.

When the procedure described above is carried out but substituting the appropriate benzyl alkyl sulfone and 2-halopyridine for 4-chlorobenzyl ethyl sulfone and 2-bromopyridine, respectively, the following sulfones are obtained: phenyl-2-pyridylmethyl isobutyl sulfone; 4-dimethylaminophenyl - (5 - chlor - 2 - pyridyl) - methyl ethyl sulfone; 4-N-piperidinophenyl-(5-methoxy-2-pyridyl)methyl n-butyl sulfone; 3-trifluoromethylphenyl - (5 - bromo - 2 - pyridyl)-methyl isobutyl sulfone; 4-phenylphenyl-2-pyridylmethyl ethyl sulfone; 4-benzylphenyl-2-pyridylmethyl methyl sulfone; and the like. Treatment of these sulfones in their free base forms with ethanolic-hydrogen chloride according to the procedure described in Example 9 converts the sulfones into the form of their respective hydrochloride addition salts.

EXAMPLE 2

*Phenyl-2-pyridylmethyl ethyl sulfone*

When the procedure described above for Example 1B is followed, but using 25.2 g. of benzyl ethyl sulfone and 5.6 g. of sodium amide in 150 cc. of dry toluene and 11.06 g. of 2-bromopyridine, with a reflux period of thirty minutes, there was obtained after three recrystallizations from ethanol-water 4.1 g. of the free base form of phenyl-2-pyridylmethyl ethyl sulfone, M. P. 141–141.5° C. (corr.).

Anal. Calcd. for $C_{14}H_{15}NO_2S$: N, 5.37; S, 12.27. Found: N, 5.42; S, 12.16.

The same product, phenyl-2-pyridyl ethyl sulfone, is obtained when in the above procedure 2-bromopyridine is replaced by 2-chloropyridine or 2-iodopyridine.

Treatment of this sulfone in its free base form with ethanolic-hydrogen chloride as described in Example 9 converts it into the form of its hydrochloride addition salt.

EXAMPLE 3

*Phenyl-2-pyridylmethyl n-propyl sulfone*

This preparation is carried out according to the procedure described above for Example 1B except a reflux period of four hours was employed using the following reactants: 30.0 g. of benzyl n-propyl sulfone and 6.2 g. of sodium amide in 250 cc. of dry toluene and 16.0 g. of 2-bromopyridine. The product in its free base form recrystallized as white needles from ethanol-water and melted at 121.6–122.8° C. (corr.).

Anal. Calcd. for $C_{15}H_{17}NO_2S$: N, 5.09; S, 11.64. Found: N, 5.15; S, 11.77.

Treatment of this sulfone in its free base form with benzenesulfonic acid converts it into the form of its benzenesulfonate addition salt.

EXAMPLE 4

*4-methoxyphenyl-2-pyridylmethyl ethyl sulfone*

This preparation was carried out according to the procedure described above for Example 1B, but using a reflux period of four hours and the following reactants: 60.0 g. of 4-methoxybenzyl ethyl sulfone and 13 g. of sodium amide in 500 cc. of dry toluene and 44.5 g. of 2-bromopyridine in 200 cc. of dry toluene. The product, in its free base form, melted at 138.8–140.8° C. (corr.) after several recrystallizations from methanol.

Anal. Calcd. for $C_{15}H_{17}NO_3S$: N, 4.82; S, 11.01. Found: N, 4.68; S, 11.07.

This sulfone in the form of its hydrochloride addition salt is prepared by treating the base with ethanolic-hydrogen chloride as described in Example 9.

When the above procedure is followed but using the appropriate benzyl alkyl sulfones in place of 4-methoxybenzyl ethyl sulfone, the following compounds result: 3-ethoxy-4-methoxyphenyl-2-pyridylmethyl ethyl sulfone; 4-n-butoxyphenyl-2-pyridylmethyl methyl sulfone; 3,4-dibenzyloxyphenyl-2-pyridylmethyl ethyl sulfone; 3-ethoxy-4-benzyloxyphenyl - 2 - pyridylmethyl ethyl sulfone; 3 - phenoxyphenyl - 2 - pyridylmethyl methyl sulfone; 3,4,5-trimethoxyphenyl-2-pyridylmethyl ethyl sulfone; and the like.

EXAMPLE 5

*Phenyl-2-pyridylmethyl n-butyl sulfone*

This preparation was carried out according to the procedure given in Example 1B, but using a reflux period of three hours and the following reactants: 50 g. of phenyl n-butyl sulfone and 11.5 g. of sodium amide in 500 cc. of dry toluene and 37.0 g. of 2-bromopyridine in 150 cc. of dry toluene. The product, in free base form, recrystallized as white needles from benzene-petroleum ether, M. P. 101.4–102.6° C. (corr.).

Anal. Calcd. for $C_{16}H_{19}NO_2S$: N, 4.85; S, 11.08. Found: N, 4.75; S, 11.10.

Treatment of this sulfone with ethanolic-hydrogen chloride as described in Example 9 results in the formation of phenyl-2-pyridylmethyl n-butyl sulfone in form of its hydrochloride addition salt.

EXAMPLE 6

*Phenyl-2-pyridylmethyl methyl sulfone*

This preparation was carried out according to the procedure described in Example 1B, but using 41.0 g. of benzyl methyl sulfone and 10.0 g. of sodium amide in 500 cc. of dry toluene and 38.0 g. of 2-bromopyridine in 100 cc. of dry toluene. The white crystalline product, in free base form, melted at 125.6–126.5° C. (corr.) when recrystallized from benzene-petroleum ether.

Anal. Calcd. for $C_{13}H_{13}NO_2S$: N, 5.67; S, 12.98. Found: N, 5.64; S, 13.14.

EXAMPLE 7

*3,4-dichlorophenyl-2-pyridylmethyl ethyl sulfone*

This preparation was carried out according to the procedure described above in Example 1B, but using a reflux period of four hours and the following reactants: 25.3 g. of 3,4-dichlorobenzyl ethyl sulfone and 4.0 g. of sodium amide in 150 cc. of dry toluene and 15.8 g. of 2-bromopyridine in 50 cc. of dry toluene. The product, in the form of its free base, melted at 121.0–122.4° C. (corr.) when recrystallized from ethanol-water.

Anal. Calcd. for $C_{14}H_{13}Cl_2NO_2S$: N, 4.24; S, 9.71. Found: N, 4.12; S, 9.78.

When in the preceding preparation 3,4-dibromobenzyl ethyl sulfone is substituted for 3,4-dichlorobenzyl ethyl sulfone, the resulting product is 3,4-dibromophenyl-2-pyridylmethyl ethyl sulfone.

EXAMPLE 8

*4-chlorophenyl-2-pyridylmethyl methyl sulfone*

This preparation was carried out according to the procedure described in Example 1B, but using a reflux period of three hours and the following reactants: 30.7 g. of 4-chlorobenzyl methyl sulfone and 5.9 g. of sodium amide in 500 cc. of dry toluene and 23.7 g. of 2-bromopyridine in 100 cc. of dry toluene. The white crystalline product, in free base form, melted at 98.8–100.7° C. (corr.) when recrystallized from methanol-water.

Anal. Calcd. for $C_{13}H_{12}ClNO_2S$: Cl, 12.58; S, 11.38. Found: Cl, 12.48; S, 11.24.

Treatment of this sulfone with sulfuric acid in the usual manner for preparation of addition salts yields 4-chlorophenyl - 2 - pyridylmethyl methyl sulfone in the form of its sulfate addition salt. The corresponding hydrochloride addition salt, formed as described in Example 9, was quite soluble in absolute ethanol.

EXAMPLE 9

*4-chlorophenyl-(4-methyl-2-pyridyl) methyl ethyl sulfone*

A mixture of 30.2 g. of 4-chlorobenzyl ethyl sulfone, 5.5 g. of sodium amide and 300 cc. of dry toluene in a 1-liter three-necked flask equipped with a mercury-seal stirrer, a condenser protected with a drying tube and a dropping funnel, was refluxed for two hours during which time most of the sodium amide had reacted. A solution of 11.9 g. of 2-bromo-4-methylpyridine in 50 cc. of dry toluene was added to the refluxing reaction mixture over a period of one hour. Refluxing was then continued for an additional four hours. The cooled reaction mixture was washed with water and the product extracted with 6 N hydrochloric acid. The acidic extract was neutralized with 35% aqueous sodium hydroxide solution and the liberated oil taken up in benzene. The benzene was removed by distilling under reduced pressure and the residue dissolved in a minimum amount of absolute ethanol. To this alcohol solution was added ethanolic-hydrogen chloride solution and the resulting mixture was chilled, whereupon a white crystalline solid separated. Two recrystallizations of this solid from absolute ethanol, treating with decolorizing charcoal in each instance, yielded 7.5 g. of the white crystalline 4-chlorophenyl-2-(4-methylpyridyl) methyl ethyl sulfone in the form of its hydrochloride addition salt, M. P. 208–210° C. (corr.) with decomposition.

Anal. Calcd. for $C_{15}H_{16}ClNO_2S \cdot HCl$: S, 9.26; N, 4.04. Found: S, 9.20; N, 3.96.

When the foregoing procedure is followed but using the appropriate benzyl alkyl sulfone and 2-halopyridine in place of 4-chlorobenzyl ethyl sulfone and 2-bromo-4-methylpyridine, respectively, the following compounds, in the forms of their hydrochloride addition salts, may be obtained: 4-chlorophenyl-(3-ethyl - 4 - methyl-2-pyridyl)methyl ethyl sulfone; 4-bromophenyl-(6-methyl - 2 - pyridyl)methyl methyl sulfone; phenyl-(4-methyl - 2 - pyridyl)methyl n-propyl sulfone; 4-chlorophenyl-(3-n-propyl-2-pyridyl) - methyl methyl sulfone; and the like.

EXAMPLE 10

*3,4-dichlorophenyl-(4-methyl-2-pyridyl) - methyl ethyl sulfone*

This preparation was carried out according to the procedure described in Example 9, but using 63.3 g. of 3,4-dichlorobenzyl ethyl sulfone and 9.8 g. of sodium amide in 350 cc. of dry toluene and 21.6 g. of 2-bromo-4-methylpyridine in 50 cc. of dry toluene. The product, in the form of its hydrochloride addition salt, melted at 188.4–189.6° C. (corr.) when recrystallized from acetone.

Anal. Calcd. for $C_{15}H_{15}Cl_2NO_2S \cdot HCl$: N, 3.68; S, 8.42. Found: N, 3.57; S, 8.30.

Substitution of 3,5-dibromobenzyl ethyl sulfone for 3,4-dichlorobenzyl ethyl sulfone in the foregoing procedure yields 3,5-dibromophenyl-(4-methyl-2-pyridyl)methyl ethyl sulfone in the form of its hydrochloride addition salt.

EXAMPLE 11

*2-chlorophenyl-2-pyridylmethyl methyl sulfone*

This preparation was carried out following the procedure described hereinabove in Example 9, but using 100 g. of 2-chlorobenzyl methyl sulfone and 19.0 g. of sodium amide in 600 cc. of dry toluene and 20.0 g. of 2-bromopyridine in 100 cc. of dry toluene, with a reflux period of three and one-half hours. The product, 2-chlorophenyl-2-pyridylmethyl methyl sulfone, in the form of its hydrochloride addition salt, melted at 196.5–198.6° C. (corr.) with decomposition.

Anal. Calcd. for $C_{13}H_{12}ClNO_2S \cdot HCl$: Cl, 22.28; S, 10.08. Found: Cl, 21.80; S, 9.76.

EXAMPLE 12

*3-chlorophenyl-2-pyridylmethyl methyl sulfone*

This preparation was carried out following the procedure described in Example 1B, but using 54.7 g. of 3-chlorobenzyl methyl sulfone and 9.75 g. of sodium amide in 200 cc. of dry toluene and 19.2 g. of 2-bromopyridine in 40 cc. of dry toluene, with a reflux period of one hour. The product, in its free base form, crystallized from methanol, melted at 116.2–117.6° C. (corr.).

Anal. Calcd. for $C_{13}H_{12}ClNO_2S$: S, 11.38; Cl, 12.58. Found: S, 11.49; Cl, 12.38.

This sulfone in its hydrochloride addition salt form was appreciably soluble in absolute ethanol.

EXAMPLE 13

*4-chlorophenyl-(4-methyl-2-pyridyl) methyl methyl sulfone*

This preparation was carried out following the procedure described in Example 9, but using 60 g. of 4-chlorobenzyl methyl sulfone and 11.5 g. of sodium amide in 500 cc. of dry toluene and 25.4 g. of 2-bromo-4-methylpyridine in 100 cc. of dry toluene. The product, in its hydrochloride addition salt form, melted with decomposition at 209.0–210.0° C. (corr.).

Anal. Calcd. for $C_{14}H_{14}ClNO_2S \cdot HCl$: S, 9.65; N, 4.22. Found: S, 9.37; N, 4.12.

The above preparation can also be run using, in place of sodium amide, other strongly basic condensing agents such as sodium hydride, potassium amide, phenyl lithium, and the like.

EXAMPLE 14

*4-chlorophenyl-(6-methyl-2-pyridyl) methyl methyl sulfone*

This preparation was carried out following the procedure described above in Example 1B, but using 60 g. of 4-chlorobenzyl methyl sulfone and 11.5 g. of sodium amide in 450 cc. of dry toluene and 25.4 g. of 2-bromo-6-methylpyridine in 150 cc. of dry toluene. The product, in the form of its free base, melted at 98.4–99.6° C. (corr.) when recrystallized from methanol-petroleum ether.

Anal. Calcd. for $C_{14}H_{14}ClNO_2S$: S, 10.84; N, 4.74. Found: S, 10.83; N, 4.89.

Additional basic sulfones, in their free base forms, which can be prepared by following the above procedure but using the appropriate reactants include the following: 3-bromophenyl-(5-chloro-2-pyridyl)methyl methyl sulfone; 4-iodophenyl - (5 - iodo - 2 - pyridyl)methyl n-butyl sulfone; 3 - ethoxy - 4 - isopropylphenyl-(5-ethoxy-2-pyridyl)methyl ethyl sulfone; 3-ethoxy - 4 - iodophenyl - (5 - chloro - 2-pyridyl)methyl n-propyl sulfone; 3,4-diethoxyphenyl-(5-n-butyl-2-pyridyl)methyl methyl sulfone; 4 - bromophenyl - (5 - bromo - 2 - pyridyl) - methyl ethyl sulfone; and the like.

EXAMPLE 15

*4-methylphenyl-2-pyridylmethyl ethyl sulfone*

This preparation was carried out following the procedure described above in Example 9, but using 70 g. of 4-methylbenzyl ethyl sulfone and 13.8 g. of sodium amide in 400 cc. of dry toluene and 27.9 g. of 2-bromopyridine in 100 cc. of dry toluene. The product, in its hydrochloride addition salt form, melted with decomposition at 195.6–198.0° C. (corr.).

Anal. Calcd. for $C_{15}H_{17}NO_2S \cdot HCl$: S, 10.28; N, 4.49. Found: S, 10.01; N, 4.37.

When the foregoing procedure is followed, but using 3-ethylbenzyl methyl sulfone in place of 4-methylbenzyl ethyl sulfone, the resulting product is 3-ethylphenyl-2-pyridylmethyl methyl sulfone in the form of its hydrochloride addition salt.

I claim:
1. A sulfone having the formula

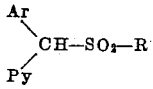

where Ar is a member of the group consisting of the phenyl radical and phenyl radicals substituted by from one to three substituents selected from the class consisting of alkyl having one to six carbon atoms, alkoxy having one to six carbon atoms, phenyl, phenylalkyl having seven to ten carbon atoms, phenoxy, phenylalkoxy having seven to ten carbon atoms, halo, tertiary-amino and trifluoromethyl, where Py is a member of the group consisting of 2-pyridyl, 5-(lower alkoxy)-2-pyridyl, 5-halo-2-pyridyl and (lower alkyl)-substituted-2-pyridyl and R is a lower alkyl radical having one to six carbon atoms.

2. 4-chlorophenyl-2-pyridylmethyl ethyl sulfone.

3. 4-chlorophenyl-2-pyridylmethyl methyl sulfone.

4. 4 - chlorophenyl - (4 - methyl - 2 - pyridyl) - methyl ethyl sulfone.

5. 4 - chlorophenyl - (4 - methyl - 2 - pyridyl) - methyl methyl sulfone.

6. 3,4 - dichlorophenyl - 2 - pyridylmethyl ethyl sulfone.

7. 3,4 - dichlorophenyl - (4 - methyl - 2-pyridyl) methyl ethyl sulfone.

8. 2 - chlorophenyl - 2 - pyridymethyl methyl sulfone.

9. 3 - chlorophenyl - 2 - pyridylmethyl methyl sulfone.

10. 4 - methylphenyl - 2- pyridylmethyl ethyl sulfone.

11. The process of preparing a sulfone having the formula

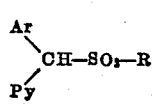

where Ar is a member of the group consisting of the phenyl radical and phenyl radicals substituted by from one to three substituents selected from the class consisting of alkyl having one to six carbon atoms, alkoxy having one to six carbon atoms, phenyl, phenylalkyl having seven to ten carbon atoms, phenoxy, phenylalkoxy having seven to ten carbon atoms, halo, tertiary-amino and trifluoromethyl, where Py is a member of the group consisting of 2-pyridyl, 5-(lower alkoxy)-2-pyridyl, 5-halo-2-pyridyl and (lower alkyl)-substituted-2-pyridyl and R is a lower alkyl radical having one to six carbon atoms, which comprises heating a benzyl lower alkyl sulfone having the formula, $ArCH_2-SO_2-R$, with a 2-halopyridine having the formula, Py-halogen, in the presence of a strongly basic condensing agent.

12. The process of preparing 4-chlorophenyl-2-pyridylmethyl ethyl sulfone which comprises heating 4-chlorobenzyl ethyl sulfone with 2-bromopyridine in the presence of sodium amide.

13. The process of preparing 4-chlorophenyl-2-pyridylmethyl methyl sulfone which comprises heating 4-chlorobenzyl methyl sulfone with 2-bromopyridine in the presence of sodium amide.

14. The process of preparing 4-chlorophenyl-(4-methyl-2-pyridyl)methyl ethyl sulfone which comprises heating 4-chlorobenzyl ethyl sulfone with 2-bromo-4-methylpyridine in the presence of sodium amide.

15. The process of preparing 4-chlorophenyl-(4 - methyl - 2 - pyridyl)methyl methyl sulfone which comprises heating 4-chlorobenzyl methyl sulfone with 2-bromo-4-methylpyridine in the presence of sodium amide.

16. The process of preparing 3,4-dichlorophenyl-2-pyridylmethyl ethyl sulfone which comprises heating 3,4-dichlorobenzyl ethyl sulfone with 2-bromopyridine in the presence of sodium amide.

No references cited.